Dec. 15, 1953  O. G. SCHWEDE  2,662,980
ROTATRON - ELECTRICAL TRANSDUCER
Filed July 25, 1950  3 Sheets-Sheet 1

INVENTOR.
OTTO G. SCHWEDE
BY D. C. Snyder
Warren T. Jessup
ATTORNEYS

Dec. 15, 1953   O. G. SCHWEDE   2,662,980
ROTATRON - ELECTRICAL TRANSDUCER
Filed July 25, 1950   3 Sheets-Sheet 2

INVENTOR.
OTTO G. SCHWEDE
BY D. C. Snyder
Warren T. Jessup
ATTORNEYS

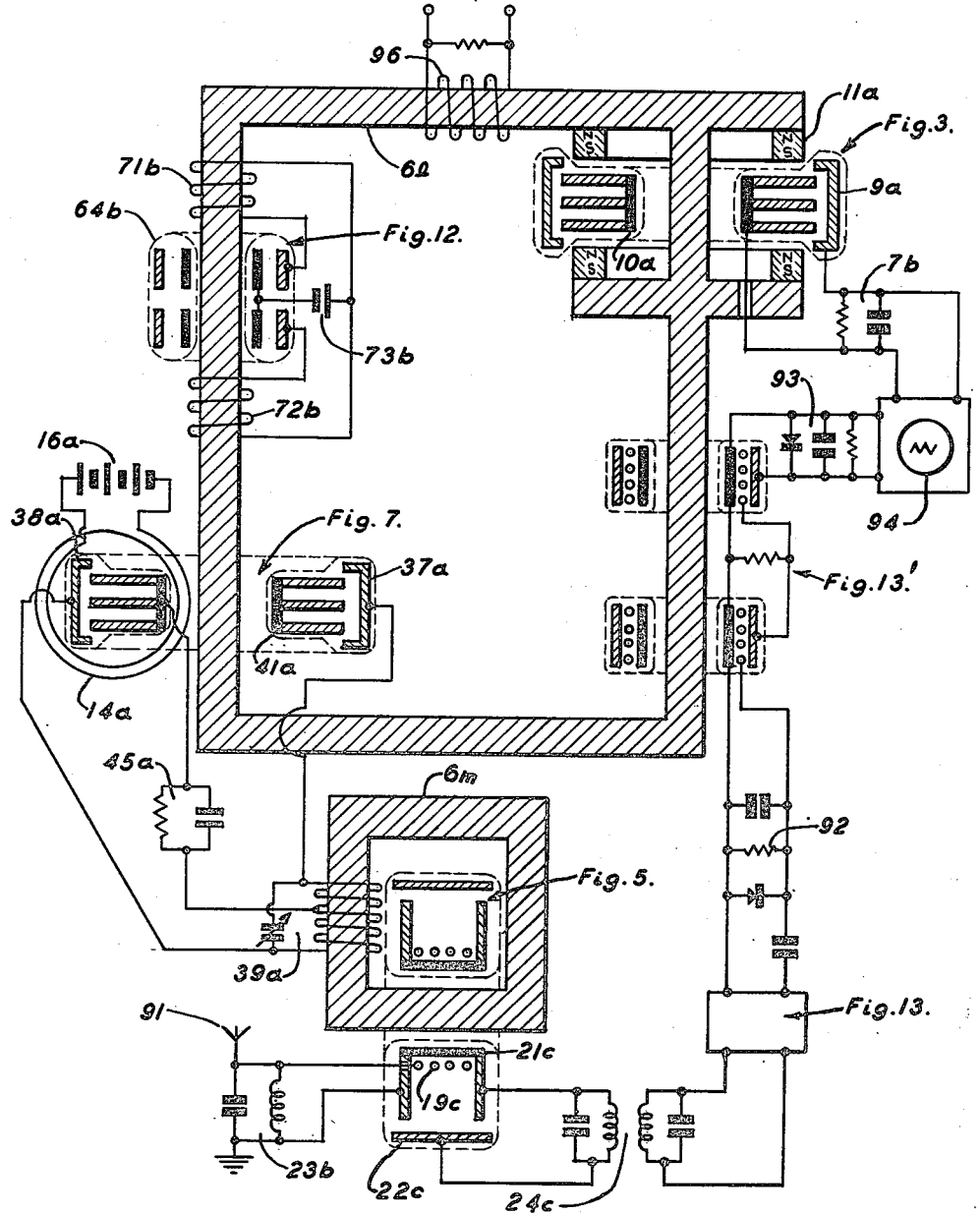

Patented Dec. 15, 1953

2,662,980

UNITED STATES PATENT OFFICE 2,662,980

ROTATRON-ELECTRICAL TRANSDUCER

Otto G. Schwede, Camarillo, Calif.

Application July 25, 1950, Serial No. 175,842

10 Claims. (Cl. 250—27)

(Granted under Title 35, U. S. Code (1952), sec. 266)

My invention relates to a device for controlling flow of electrical energy.

An object of my invention is to control flow of electrical energy by transferring energy from an electric eddy field to a load impedance.

It is a known fact in physics that energy can be imparted to electrically charged particles only by subjecting said particles to an electric field. The term electric field includes two known field configurations:

(a) An electric field in which electrical charges are present and the lines of electrical force begin at a positive electrical charge and end at a negative electrical charge. This first field configuration will be called an electrostatic field.

(b) An electric field in which electrical charges are absent and the lines of electrical force are closed in themselves. Such a field is produced by a varying magnetic field. This second field configuration will be called an electric eddy field.

As there is no perfect insulator nor perfect conductor, neither a pure electrostatic nor a pure electric eddy field can be found in electrical devices. Therefore, an electric field is called "electrostatic" regardless of the presence of a weak electric eddy field, if the movement of charged particles is principally determined by the electrostatic field. Similarly, if movement is controlled largely by the electric eddy field, that field determines the nomenclature used. Movement of electrically charged particles may occur in solid, liquid and gaseous mediums, the term gaseous medium including anything down to a vacuum of the lowest physically attainable gas pressure.

It is known in the prior art that small particles such as electrons may be accelerated to extremely high velocities by subjecting them to the influence of an electric eddy field in a gaseous medium. The high speed electrons thus produced may be used to originate X-rays by causing the electrons to hit a small target, thus transforming their kinetic energy into X-rays and heat. In the design of devices embodying this known principle great care is taken to compensate for centrifugal forces exerted upon the electrons and to avoid any electrical counterforce which would tend to decelerate the movement of the electrons before hitting the target, because deceleration results in decreasing efficiency.

In contrast to these known devices the apparatus according to my invention utilizes the centrifugal forces exerted upon rotating charged particles. My apparatus comprises an electric eddy field for whirling the electrons, and electrodes which maintain an electric field in opposition to the radial movement of the charged particles to retard the movement of said particles thereby to extract electrical energy from them. The extracted electrical energy is utilized in a load impedance connected to these electrodes in the apparatus.

Other objects and many of the attendant advantages of this invention will be readily appreciated as the same becomes better understood by reference to the following description.

Figure 7:
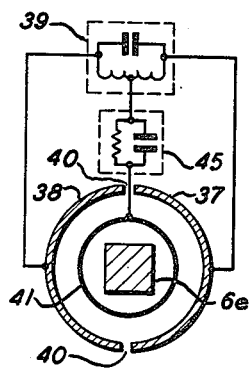
Figure 8:
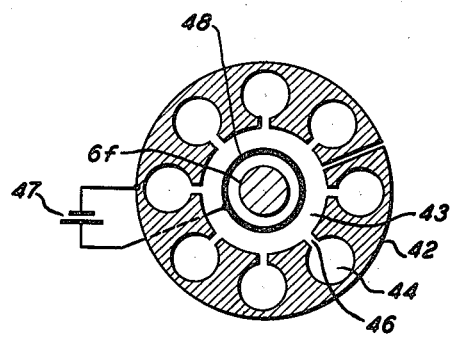
Figure 9:
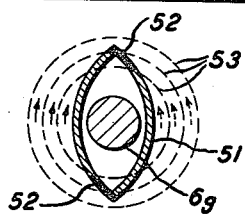
Figure 11:
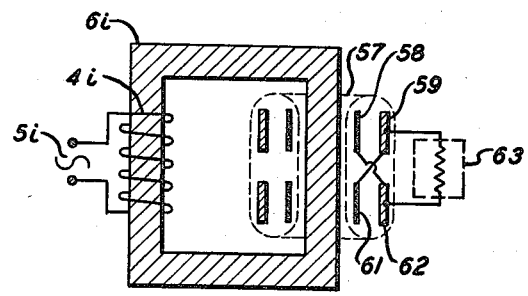
Figure 10:
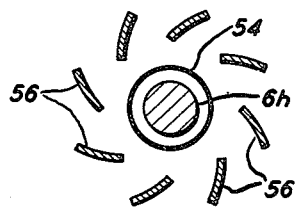
Figure 12:
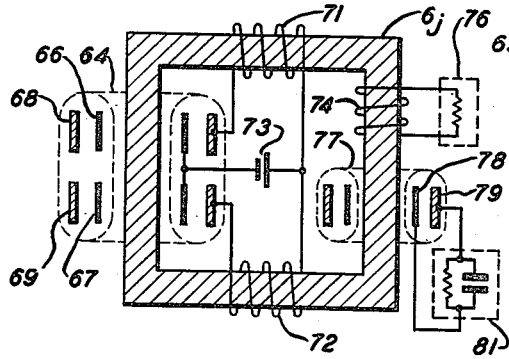
Figure 13:
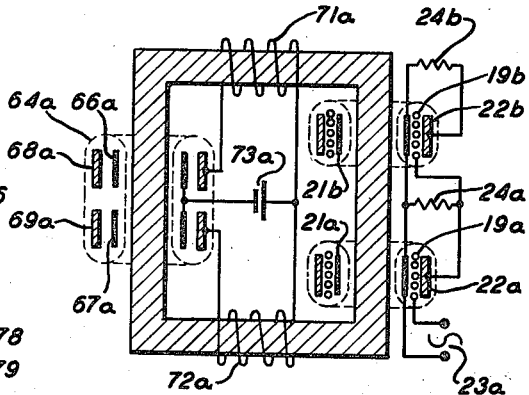

Figs. 3, 4, 5, and 6 show various useful modifications in accordance with the invention;

Figs. 7 and 8 refer to oscillation generators;

Figs. 9 and 10 illustrate partial views of modifications of a cathode structure;

Fig. 11 represents a voltage transforming device in accordance with the invention; and Figs. 12, 13, and 14 show combinations of a voltage converting device and modifications of the invention.

The drawings show the underlying principle rather than design measurements. Unessential parts have been omitted in order to aid in a clear understanding of the principles of the invention.

Figure 1:
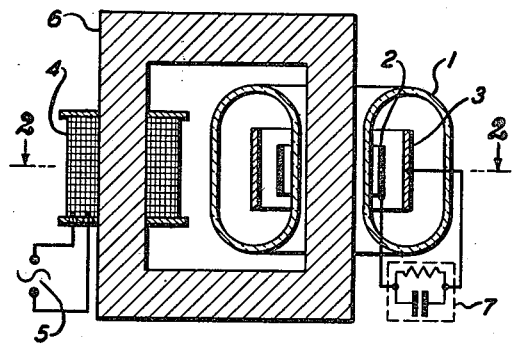
Fig. 1 is a vertical cross-sectional view of an apparatus for control of flow of electrical energy.
Figure 2:
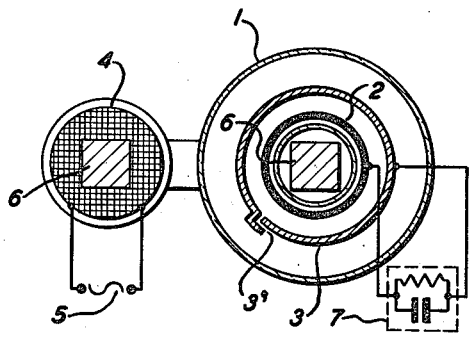
Fig. 2 is the horizontal cross-sectional view taken on line 2—2 of Fig. 1.

Referring particularly to Fig. 1, the underlying principle is explained in a simple manner. The apparatus comprises an evacuated toroidal envelope 1, a cylindrical cathode 2 and a cylindrical anode 3 centrally disposed within the envelope. The anode 3 is broken at 3' to prevent circulation of induced eddy currents which would waste power needlessly and distort the eddy field. A coil 4 connected to a source of alternating current 5 produces an alternating magnetic field which is linked by the core 6 to the envelope 1. An external load impedance 7 is connected across the cathode 2 and anode 3. When the coil 4 is energized by the source 5 an electric eddy field is created within the envelope 1 around the core 6. This electric eddy field induces a current in the ring shaped cathode 2 thereby heating the emissive surface. Electrons are emitted from the cathode 2, are accelerated by the electric eddy field intermediate cathode 2 and anode 3, and start to revolve around the cathode 2. At each turn the electrons gain energy from the electric eddy field and their velocity increases. As the electrons rotate in a circular path, centrifugal forces operate upon them so that the path of the electrons becomes a spiral of ever increasing radius until the electrons hit the anode 3. From the anode 3 the electrons travel through the load impedance 7 and back to the cathode 2. The flow of electrons through the load impedance 7 produces voltage across the terminals of said load impedance and establishes an electrostatic counterfield between anode 3 and cathode 2. This electrostatic counterfield acts upon successive electrons which spiral around the cathode 2 in the space intermediate cathode 2 and anode 3. The influence of the electrostatic counterfield decelerates the spiralling electrons thereby extracting electrical energy therefrom. This energy is transferred to the load impedance 7. Therefore, the kinetic energy of the electrons when they finally hit the anode is less than the total energy imparted to them by the electric eddy field. In this way the electrons transfer energy from the electric eddy field to the load impedance 7.

The direction of rotation of the electrons around the cathode 2 depends upon the direction of the electric eddy field which reverses its direction twice during each cycle of the alternating magnetic field. The final effect of the forces operating upon the electrons, however, is the same in both cases, namely, an electron current flows from the cathode 2 to the anode 3 and produces a voltage across the load impedance 7.

The function of the device described by Fig. 1 and the foregoing is the same as of a combination of a transformer and a full wave rectifier tube. In contrast to the latter combination the device according to my invention does not require a secondary coil which at high voltages must be carefully insulated, occupies a large space and has a high weight.

A modification shown in Fig. 3 and described hereinafter comprises in addition to the elements of Fig. 1, a ring shaped electrode structure 8 adapted to be traversed by the electrons for shielding the initial part of the movement of the electrons from the influence of the electrostatic counterfield which is established between the anode 9 and the cathode 10, and a magnetic structure 11 for creating a constant magnetic field substantially normal to the effective electric eddy field. The electrode structure 8 is connected to the cathode 10 and therefore has the same potential as the cathode 10. Its shielding effect restricts the strong electrostatic counterfield substantially to the region between the anode 9 and the electrode structure 8. Therefore, the electrons emitted from the cathode 10 can spiral freely around the cathode 10 within the space substantially enclosed by the cathode 10 and the rings of the electrode structure 8.

Because of the centrifugal forces which operate upon the electrons, the electrons travel the total radial distance of the ring shaped electrode structure 8 in only a few revolutions; therefore, a constant magnetic field normal to the plane of the electrode structure 8 is maintained by two ring-shaped permanent magnets 11 disposed above and below the envelope 13. The effective field of the magnets 11 is substantially restricted to the region enclosed by the cathode 10 and the electrode structure 8. This constant magnetic field counteracts the centrifugal forces with the result that the electrons spiral around the cathode 10 in a large number of turns until they enter the electrostatic counterfield. Because of the many turns the velocity of the electrons will be high enough to engender a centrifugal force sufficient to overcome the repelling forces of the electrostatic counterfield.

Another modification described hereinafter and shown in Fig. 4 comprises a coil 14 in place of the permanent magnet 11 shown in Fig. 3. The coil is energized by a source of direct current 16 and produces a constant magnetic field substantially coinciding with the electric eddy field. This magnetic field prevents the electrons from deviating out of the plane of the electric eddy field. Therefore, the effect of stray fields at the outer edge of the electrode structure 17 and of repelling forces within the electron stream which tend to drive the electrons toward the electrode structure 17 is minimized and the electrons rotate within the region enclosed by the cathode 18 and the electrode structure 17 until they have reached a sufficiently high velocity which is accompanied by such centrifugal force as to enable the electrons to overcome the repelling forces of the electrostatic counterfield.

Figure 5:
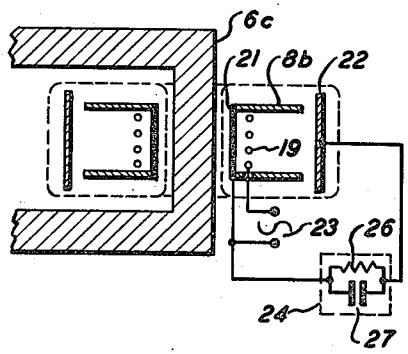

A further improvement upon the embodiments shown in Figs. 1, 2, 3, and 4 results from the arrangement shown in Fig. 5, where an additional electrode structure 19 is provided. This electrode structure 19, in the nature of a grid adapted to be traversed by the emitted electrons, is disposed intermediate the cathode 21 and the anode 22 and is connected to a source of alternating voltage 23. By means of this electrode structure 19 the flow of electrons may be additionally controlled at the initial part of the spiral movement of the electrons where the centrifugal forces are low. Thus the amplitude of the control voltage 23 may be small. The load impedance 24 comprises a resistor 26 and a capacitor 27.

Figure 6:
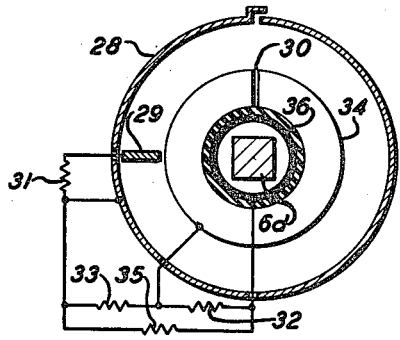

In the modification shown in Fig. 6 a radial shield 29 has been added within the anode 28 to retard the circumferential movement of the electrons, and an external impedance 31 employed to connect the two members. Fig. 6 also illustrates an alternative way of constructing the ring shaped electrode 34 by insulating it from the cathode 36 within the envelope, and connecting 36 and 34 externally thru an impedance 32. As in the other embodiments, the load 35 is connected between anode 28 and cathode 36. An impedance 33 may be connected between electrode 34 and anode 28, the two impedances 32 and 33 thus forming a fixed potentiometer for determining the potential of the electrode 34. Like the anode, the electrode 34 is broken at 30 to block circulation of eddy currents.

Another modification of an anode structure is shown in Fig. 7 where the anode structure comprises two semi-cylindrical halves 37 and 38 which are connected to the two opposite terminals of a tuned circuit 39 serving as a load impedance. The electrons revolving around the cathode 41 close to the anode structure 37 and 38 pass the gaps 40 between 37 and 38 thereby inducing electrical currents which may be utilized to maintain oscillation of the tuned circuit 39. An additional load impedance 45 is connected between the cathode 41 and a suitable point of the tuned circuit 39. Its purpose is to provide a source of voltage between the anode structure 37—38 and the cathode 41 by utilizing the voltage drop which is established across a load impedance by a current flowing through that load impedance. The effect of the electrostatic field maintained by that voltage between the anode and the cathode upon the rotating electrons causes them to rotate many times close to the anode before impinging upon the anode.

A further modification of an anode structure exhibiting certain advantages for generation of microwaves is shown in Fig. 8. In the anode structure 42 which substantially encloses an orbital space 43 are cavities 44 serving as load impedances and having the properties of tuned resonant circuits with openings 46 toward the orbital space 43. A source of voltage 47 is connected to the anode structure 42 and the cathode 48. As described in the foregoing the electrostatic field established by that source of voltage 47 between the anode 42 and the cathode 48 together with the electric eddy field from the flux path 6f causes the electrons to rotate many times close to the anode 42 before impinging upon it. During these rotations part of the electrons are retarded in their tangential movement by the field across the openings 46 of the tuned cavities 44 whereby energy is transferred into the tuned cavities. These electrons are forced slightly back towards the cathode by the electrostatic counterfield between anode 42 and cathode 48, and rotate in an orbit of smaller radius. Then by the effect of the electric eddy field, they are accelerated to their former velocity, rotate again in their former orbit close to the anode and transfer the accumulated energy to the tuned cavities 44. The other part of the electrons are accelerated in their tangential movement by the field across the openings 46 of the tuned cavities 44 whereby energy is transferred from the tuned cavities to the electrons. These electrons increase the radius of their orbit because the higher velocity is accompanied by a higher centrifugal force. These electrons will quickly impinge upon the anode 42. The result of the described mechanism is an excess of electrons which are capable of transferring energy from the electric eddy field into the load impedance represented by the tuned cavities 44.

Further features of my invention consist in providing a cathode 51, the geometrical shape and disposition of the emissive surfaces of the cathode being such as to establish angles greater than zero between the plane of the surfaces and the lines of force of the alternating eddy field as shown in Fig. 9, wherein 6g is a magnetic core, 51 is a cathode, 52 are emissive surfaces of the cathode 51, and 53 are lines of force of the electric eddy field. As can be seen the emission of the cathode depends upon the rotational direction of the eddy field. Clockwise rotation, as indicated by solid arrows, results in increased emission because the electrons are accelerated away from the cathode by the electric eddy field and start a spiral path which removes them from the surfaces 52. Counterclockwise rotation, as indicated by dotted arrows, repels electrons already having left the cathode 51 back towards the cathode resulting in a decreased emission. Changing the disposition of the emissive surfaces, of course, will reverse the effect. Therefore, it is possible to design cathodes responding to clockwise and cathodes responding to counterclockwise rotations of the electric eddy field. These cathodes, as distinguished from "bidirectional" cathodes which respond to either rotation of the electric eddy field, will be referred to hereinafter as "left" and "right directional" cathodes.

Another modification of a rotation sensing cathode structure is shown in Fig. 10, wherein 6h is a magnetic core, 54 is a bi-directional cathode as defined in the foregoing, 56 are electrode structures disposed in the path of the emitted electrons such that electrons spiraling clockwise can traverse these electrode structures 56, while electrons spiraling counterclockwise will impinge upon these electrode structures 56. The electrode structures 56 are electrically connected to the cathode 54 so that the electrons upon impinging thereon may return to the cathode 54.

Combinations of features described in the foregoing are shown schematically in Fig. 11, where 57 is an envelope, 4i is a coil connected to a source of alternating current 5i thereby producing a periodically alternating magnetic field which is linked by a magnetic core 6i to the envelope 57 and to electrode structures 58, 59, 61, and 62. 58 is a "right directional" and 61 a "left directional" cathode as defined above. 59 and 62 are anodes surrounding the cathodes. Cathode 58 of the upper structure is electrically connected to anode 62 of the lower structure and to one terminal of a load impedance 63. Cathode 61 of the lower structure is electrically connected to anode 59 of the upper structure and to the other terminal of the load impedance 63. When the coil 4i is energized, the current flowing through the load impedance 63 is an alternating current. The voltage across the load impedance 63 may be as high as several thousand volts or as low as a fraction of a volt depending upon the design.

Another useful combination is shown in Fig. 12. It comprises a structure which converts D. C. voltage into a periodically varying current thereby producing a periodically varying magnetic field which is linked to structures connected to load impedances. The converter structure comprises an envelope 64, a left and right directional cathode 66 and 67 connected together, two anodes 68 and 69, connections between the anodes and the corresponding terminals of two coils 71 and 72, a low voltage battery 73 the negative terminal of which is connected to the cathodes 66 and 67, the positive terminal to the other terminals of the two coils 71 and 72. The magnetic field of the two coils is linked by the core 6j to the envelope 64 and the electrode structures therein. Because of the direction sensing properties of the cathodes 66 and 67 an increasing current in coil 71 increases the current from cathode 66 to anode 68 and suppresses any current from cathode 67 to anode 69. The current in coil 71 increases until it has reached its peak value and the magnetic field produced by it will be constant resulting in a decreasing current from cathode 66 to anode 68. This decreasing current in consequence reverses the direction of the electric eddy field resulting in a current from cathode 67 to anode 69 and suppression of the current from 66 to 68. In the next half cycle, coil 72 is energized and coil 71 is de-energized. The circuit described in the foregoing, therefore, performs like a switch or chopper without moving parts. The magnetic field produced by the coils 71 and 72 is a periodically varying field and may be linked by the same core 6j to another coil 74 which is connected to a load impedance 76. Consequently the current through this load impedance is an A. C. current. Core 6j may also link the periodically varying magnetic flux to a structure comprising an envelope 77, a bi-directional cathode 78 and an anode 79 therein, and connections between this anode and cathode to a load impedance 81. The mode of operation of this latter structure is the same as that described for Fig. 1. The current through the load impedance 81 is substantially a D. C. current.

In Fig. 13 multiple combinations of apparatus according to my invention are presented schematically. The converter structure is described in the foregoing example and illustrated by Fig. 12 where like numbers suffixed with "a" denote like parts. The structure feeding to the load impedances 24a and 24b are the same as those described for Fig. 5. The output current of the structure 21a, 22a, 19a flows through the load impedance 24a, establishing a voltage thereacross which thru the grid 19b controls the flow of electrical current in structure 21b, 22b, 19b. Consequently the current through the load impedance 24b depends upon the voltage applied between cathode 21a and grid structure 19a of the first structure by the source of voltage 23a.

Fig. 14 illustrates a complete receiving apparatus employing, as integrated elements thereof, certain of the apparatuses described hereinbefore. In this figure, the numerals indicate elements corresponding to those described hereinbefore, these numerals being followed by a letter to denote similarity without absolute identity.

In Fig. 14, that portion denoted "Fig. 12," is a converter capable of translating direct current energy from a battery 75b into alternating energy in the form of alternating flux in the core 6l. Operation of this portion of the Fig. 14 apparatus will be readily understood by reference to the description concerning Fig. 12. The alternating energy within the core 6l is used to power an oscillator denoted "Fig. 7." As with the embodiment illustrated in Fig. 7, the oscillation frequency is determined by the LC circuit 39a.

Linked with the coil of the tuned circuit 39a is a closed core 6m, which is also linked with an electron apparatus denoted "Fig. 5." This is essentially an amplifier as described hereinbefore in connection with Fig. 5, having a grid 19c fed with energy from an antenna 91, through an appropriate tuned circuit 23b. The antenna 91, and the tuned circuit 23b correspond to the energy source denoted 23 in Fig. 5. Mixed energy is taken from between the cathode 21c and the plate 22c of the apparatus "Fig. 5," and applied through tuned transformer coupling 24c to a box denoted "Fig. 13." This box represents an amplifier similar to that disclosed hereinbefore in connection with Fig. 13. While this amplifier could, if desired receive its energy from the core 6l, it is preferred to make an independent apparatus similar to that shown in Fig. 13, in order to preclude cross-modulation effects. Mixed energy from the amplifier "Fig. 13" is applied to a first detector 92 from whence it is used as the signal voltage to an amplifier "Fig. 13'" linked with the core 6l and thus obtaining its energy from the magnetic energy in the core 6l. The intermediate frequency thus applied in the amplifier "Fig. 13'" is applied to a second detector 93, and thence to a suitable observing device such as a cathode ray oscilloscope 94, or other suitable observing means.

Figure 3:
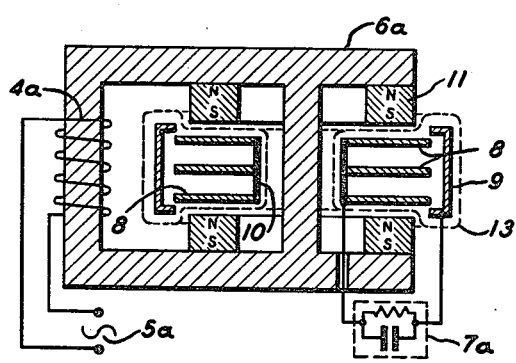
Figure 4:
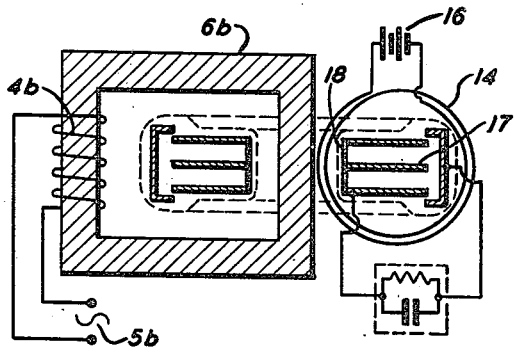

High voltage energy for powering the oscilloscope 94 may be conveniently obtained from a high voltage generating means "Fig. 3," also linked to the core 6l from which it obtains its basic energy. This high direct voltage is applied through a filter 70' to the oscilloscope.

A source of alternating voltage power for incidental uses such as the heating of isolated cathodes may be obtained by winding a coil 96 around the core 6l.

From the above description, it will be seen that in a single apparatus a great many of the concepts contained within applicant's invention may be conveniently embodied.

It is understood that the invention is not restricted to the use of electrons as charged particles. A useful improvement consists in producing at the cathode both positively and negatively charged particles, thereby utilizing the compensating and shielding effect of particles of opposite signs.

If desired, the alternating eddy field may be produced by employing a source of constant M. M. F. and then varying the magnetic properties of the magnetic structure 6; or by mechanically displacing a magnetic structure.

A further useful modification of my invention consists in additionally providing an electrode structure adapted to be traversed by the charged particles travelling between the cathode and the anode to maintain a focusing electric field.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Apparatus for controlling the flow of electrical energy comprising an envelope, a plurality of spaced electrode structures therein including a source of charged particles and an anode, means for creating an electric eddy field intermediate said source and said anode, means for preventing said first mentioned means from creating a magnetic field intermediate said source and anode, and a load impedance connected between components of said electrode structures such that an electric counterfield is created intermediate said source and anode to decelerate said particles, and thereby extract electrical energy therefrom.

2. Apparatus for controlling the flow of electrical energy comprising an envelope, a plurality of spaced electrode structures therein, said electrode structures including a source of charged particles and an anode, a source of magnetic flux, a magnetic structure linking said flux and said envelope, means for varying said flux to thereby establish an electric eddy field intermediate said source and said anode, said magnetic structure including means for preventing said varying flux from following a path including the space intermediate said source and anode, and a load impedance connected between components of said electrode structure such that an electric counterfield is created intermediate said source and anode whereby electrical energy is extracted from said apparatus.

3. A device for controlling the flow of electrical energy which comprises an envelope, a source of magnetic flux, a magnetic structure linking said flux and said envelope, said structure including a leg portion, a source of charged particles disposed within said envelope and substantially surrounding said leg portion, an anode disposed within said envelope and substantially surrounding said cathode, means for varying said flux thereby to establish an electric eddy field intermediate said source and said anode, said leg portion preventing said varying flux from creating a magnetic field intermediate said cathode and anode, and a load impedance connected between said source and said anode such that an electric counterfield is created intermediate said source and anode whereby electric energy is extracted from said device.

4. Apparatus as defined in claim 2 including means for creating a constant magnetic field intermediate said source and anode, said magnetic field being substantially normal to said electric eddy field.

5. Apparatus as defined in claim 3 including an electrode structure adapted to be traversed by said particles, for shielding part of the movement of said particles from the influence of said electric counterfield.

6. Apparatus as defined in claim 1 including an electrode structure intermediate said source and anode adapted to be traversed by said particles and connections from said structure and said source of charged particles to a source of voltage for additionally controlling the flow of said particles through said structure.

7. Apparatus for controlling the flow of electrical energy comprising a toroidal envelope, a cathode and an anode disposed therein, a coil adapted to establish a periodically varying magnetic flux, thereby producing an alternating electric eddy field which reverses its direction twice during each cycle of said magnetic flux, a magnetic structure linking said varying magnetic flux to said envelope, said structure including means for preventing said varying flux from creating a magnetic field intermediate said cathode and anode, said cathode having the property of emitting only during one direction of said alternating eddy field, and a load impedance connected to said cathode and anode such that an electric counterfield is created therebetween, whereby electric energy is extracted from said apparatus.

8. Apparatus for controlling the flow of electrical energy comprising a toroidal envelope, a cathode and an anode disposed therein, a coil adapted to establish a periodically varying magnetic flux, a source of voltage, a magnetic structure linking said varying magnetic flux to said envelope, said structure including means for preventing said varying magnetic flux from creating a magnetic field intermediate said cathode and anode, connections from said anode to one terminal of said coil and from said cathode to one terminal of said source of voltage, connections from the other terminal of said coil to the other terminal of said source of voltage, whereby the foregoing cooperate to produce an alternating electric eddy field, which reverses its direction twice during each cycle of said magnetic flux, said cathode having the property of emitting only during one of said directions of said alternating eddy field, and comprising in addition a second cathode and anode suitably disposed with respect to said varying magnetic flux, a load impedance and connections from the terminals of said load impedance to said last cathode and anode such that an electric counterfield is created intermediate said last cathode and anode whereby electrical energy is extracted from said apparatus.

9. Apparatus for controlling the flow of electrical energy comprising a toroidal envelope, two separated electrode structures disposed therein, each of said structures comprising a cathode and an anode, two coils adapted to establish a periodically varying magnetic flux thereby producing an alternating electric eddy field which reverses its direction twice during each cycle of said magnetic flux, a third coil, a load impedance, a magnetic structure linking said varying magnetic flux to said envelope and to said third coil, said structure including means for preventing said varying magnetic flux from creating a magnetic field intermediate said cathode and anode, a source of voltage, connections from said two cathodes to one terminal of said source of voltage, connections from each of said anodes to corresponding terminals of said two field coils such that an electric counterfield is created intermediate said cathodes and anodes, connections from the other terminals of said field coils to the other terminal of said source of voltage, said cathodes having the property of alternatingly emitting in accordance with the alternating direction of said alternating electric eddy field, and connections from said third coil to said load impedance whereby electric energy is extracted from said apparatus.

10. Apparatus for controlling the flow of electrical energy which comprises a toroidal envelope, two separated electrode structures disposed therein, said structures comprising a first cathode and anode and a second cathode and anode, a coil adapted to establish a periodically varying magnetic flux thereby to produce an alternating electric eddy field which reverses its direction twice during each cycle of said magnetic flux, a magnetic structure linking said magnetic flux to said envelope, said structure including means for preventing said varying magnetic flux from creating a magnetic field intermediate said cathode and anode, a load impedance, connections from said first cathode to said second anode and to said load impedance, and connections from said first anode to said second cathode and to the other terminal of said load impedance, whereby an electric counterfield is created between said cathodes and said anodes thereby extracting electrical energy from said apparatus, said first cathode having the property of emitting only during one of said directions of said electric eddy field, said second cathode having the property of emitting only during the other of said directions of said eddy field.

OTTO G. SCHWEDE.

References Cited in the file of this patent

UNITED STATES PATENTS

| Number | Name | Date |
| --- | --- | --- |
| 1,645,304 | Slepian | Oct. 11, 1927 |
| 2,114,035 | Skellett | Apr. 12, 1938 |
| 2,182,736 | Penning | Dec. 5, 1939 |
| 2,201,666 | Hollmann | May 21, 1940 |
| 2,242,888 | Hollmann | May 20, 1941 |
| 2,414,121 | Pierce | Jan. 14, 1947 |
| 2,432,748 | Glass | Dec. 16, 1947 |
| 2,482,452 | Alpert | Sept. 20, 1949 |
| 2,565,410 | Tiley | Aug. 21, 1951 |
| 2,567,904 | Philos | Sept. 11, 1951 |